United States Patent
Tudahl et al.

[11] Patent Number: 6,164,572
[45] Date of Patent: Dec. 26, 2000

[54] APPARATUS AND METHOD FOR RECYCLING GYPSUM WALLBOARD

[76] Inventors: Daniel L. Tudahl, 2201 Clements Rd.; Gary R. Bush, 3802 Spurgin Rd., both of Missoula, Mont. 59804

[21] Appl. No.: 09/375,723

[22] Filed: Aug. 16, 1999

Related U.S. Application Data

[63] Continuation-in-part of application No. 08/899,523, Jul. 24, 1997.
[60] Provisional application No. 60/022,887, Jul. 26, 1996.

[51] Int. Cl.$^7$ ..................................................... B02C 18/00
[52] U.S. Cl. ........................... 241/29; 241/24.19; 241/73; 241/152.2
[58] Field of Search .................................. 241/152.2, 29, 241/24.19, 186.8, 73, DIG. 38

[56] References Cited

U.S. PATENT DOCUMENTS

| | | | |
|---|---|---|---|
| 532,141 | 1/1895 | Cornwall | 241/135 X |
| 3,635,409 | 1/1972 | Brewer | 241/43 |
| 4,377,259 | 3/1983 | Areaux et al. | 241/73 |
| 4,385,732 | 5/1983 | Williams | 241/167 |
| 4,694,993 | 9/1987 | Endo et al. | 241/46.11 |
| 4,801,101 | 1/1989 | Dreyer et al. | 241/240 |
| 5,183,213 | 2/1993 | Knez, Jr. | 241/24 |
| 5,238,195 | 8/1993 | Knez, Jr. | 241/24 |
| 5,251,827 | 10/1993 | Sime et al. | 241/34 |
| 5,304,276 | 4/1994 | MacLeod et al. | 156/344 |
| 5,386,947 | 2/1995 | Omann | 241/41 |
| 5,577,672 | 11/1996 | Holmes | 241/14 |
| 5,609,307 | 3/1997 | Rota | 241/73 |
| 5,611,495 | 3/1997 | Williams | 241/73 |
| 5,673,861 | 10/1997 | Miller | 241/69 |

FOREIGN PATENT DOCUMENTS 0386998  3/1990  European Pat. Off. .

*Primary Examiner*—Joseph J. Hail, III
*Assistant Examiner*—William Hong
*Attorney, Agent, or Firm*—Saliwanchik, Lloyd & Saliwanchik

[57] ABSTRACT

An apparatus and method for recycling gypsum wallboard is described and claimed. Gypsum wallboard is formed from a gypsum core sandwiched between two sheets of heavy paper. The apparatus has a crushing means to crush the gypsum core of the wallboard and shred the paper covering. A grinding means further pulverizes the gypsum into a powder and tears the shredded paper into pieces that are approximately one and one-half inch in diameter. The pulverized gypsum admixed with paper pieces can be collected and used in recycled wallboard. Optionally, a separator can be included in the apparatus which isolates the gypsum powder from the paper pieces. Methods for recycling gypsum wallboard using the claimed apparatus are also described.

12 Claims, 4 Drawing Sheets

APPARATUS AND METHOD FOR RECYCLING GYPSUM WALLBOARD

The subject application is a continuation-in-part of co-pending application Ser. No. 08/899,523 filed Jul. 24, 1997 which was based on provisional application Ser. No. 60/022,887 filed Jul. 26, 1996.

BACKGROUND OF THE INVENTION

Gypsum wallboard is a common building material used in new construction and renovations to define and cover interior wall surfaces. Drywall or sheetrock, as gypsum wallboard is sometimes called, comprises a calcined gypsum core sandwiched between two layers of heavy paper. Wallboard is cut during installation to fit door and window casings, shelves, and stairways leaving odd sized pieces of scrap board. Wallboard waste is also generated during renovation and demolition. The cost of disposing of this waste and scrap board is ever increasing. Rising landfill fees reduce the profit margin for contractors and landfill space is becoming more scarce.

Calcium sulfate ($CaSO_4$), gypsum, the core of wallboard, has many uses. The mineral is used as a fluxing agent, a retarder in portland cement and a filler in paper and textiles. Ground gypsum wallboard can be used also as a component of recycled wallboard, and as blow-in insulating material. Gypsum is a natural fertilizer and reclaimed gypsum can be pelletized for use in agriculture and landscaping. Therefore, reclaiming the gypsum from scrap wallboard and recycling its components not only reduces the burden on landfills and reduces contractor dumping costs but can produce profitable new products.

Attempts to reclaim wallboard components have included using machines which tumble wallboard pieces in a large barrel containing free weights. See U.S. Pat. No. 5,183,213. The weights crush the wallboard into small pieces within the barrel releasing the gypsum from the paper. The contents of the barrel are then emptied onto a vibrating conveyor where the gypsum is separated from the paper. U.S. Pat. No. 5,238,195 describes a process by which reclaimed gypsum is added to clean gypsum and treated to produce a partially recycled wallboard core. U.S. Pat. No. 5,304,276 describes an apparatus that strips the paper from the core of the wallboard leaving the gypsum core intact to be discarded or recycled. A set of rollers crush the gypsum interface holding the paper to the core. The paper is collected in sheets and the core remains substantially intact. A shredder having a punch and die roller system to dispose of wallboard rejects generated during manufacture is described in U.S. Pat. No. 4,801,101. In European Patent Application No. 0 386 998 A1, wallboard pieces are pulverized by a hammermill releasing the paper from the gypsum. The paper and gypsum particles exit the hammermill through holes in the hammermill grate and are then separated by a series of screens. Incomplete separation of the paper from the gypsum can occur however because the paper can be torn into extremely small pieces by the hammermill and is able to pass through the screens.

Improved machines and methods for creating useable by-products of gypsum wallboard and separating reclaimed gypsum from free paper in recycled wallboard are needed. A wallboard recycling apparatus that can handle odd sized pieces of scrap board, preferably in bulk quantities, and which utilizes a single operator would increase not only the profit margin of the reclamation process but increase the profit margin of sheetrock contractors and encourage wallboard recycling.

SUMMARY OF THE INVENTION

The subject invention involves generally, an apparatus and method for recycling gypsum wallboard, the wallboard comprising a gypsum core sandwiched between two sheets of heavy paper. Specifically, the apparatus and method of the subject invention involve a machine having a crushing means to crush the gypsum core into fragments and shred the paper cover and a grinding means to pulverize the gypsum into particles and further tear the paper thereby releasing the paper from the gypsum. The crushing means is a roller having blades thereupon. The grinding means comprises a paddle assembly of a plurality of paddles mounted radially about a shaft. The apparatus of the subject invention can also include a separator comprising a screen drum through which ground gypsum passes and the paper pieces are retained thereby separating the paper pieces from the gypsum.

Methods for recycling wallboard using the apparatus of the subject invention are also described. Materials can be collected from the apparatus at any stage of the process. Materials that exit the separator are divided into gypsum powder and paper pieces.

DETAILED DESCRIPTION OF THE INVENTION

The subject invention involves generally, an apparatus and method for recycling gypsum wallboard, the wallboard comprising a gypsum core sandwiched between two sheets of heavy paper. Specifically, the subject invention involves an apparatus having a crushing means and a grinding means that breaks the wallboard into small pieces releasing the paper from the gypsum. The apparatus of the subject invention can also include a separator to separate the paper from the gypsum.

Figure 1:
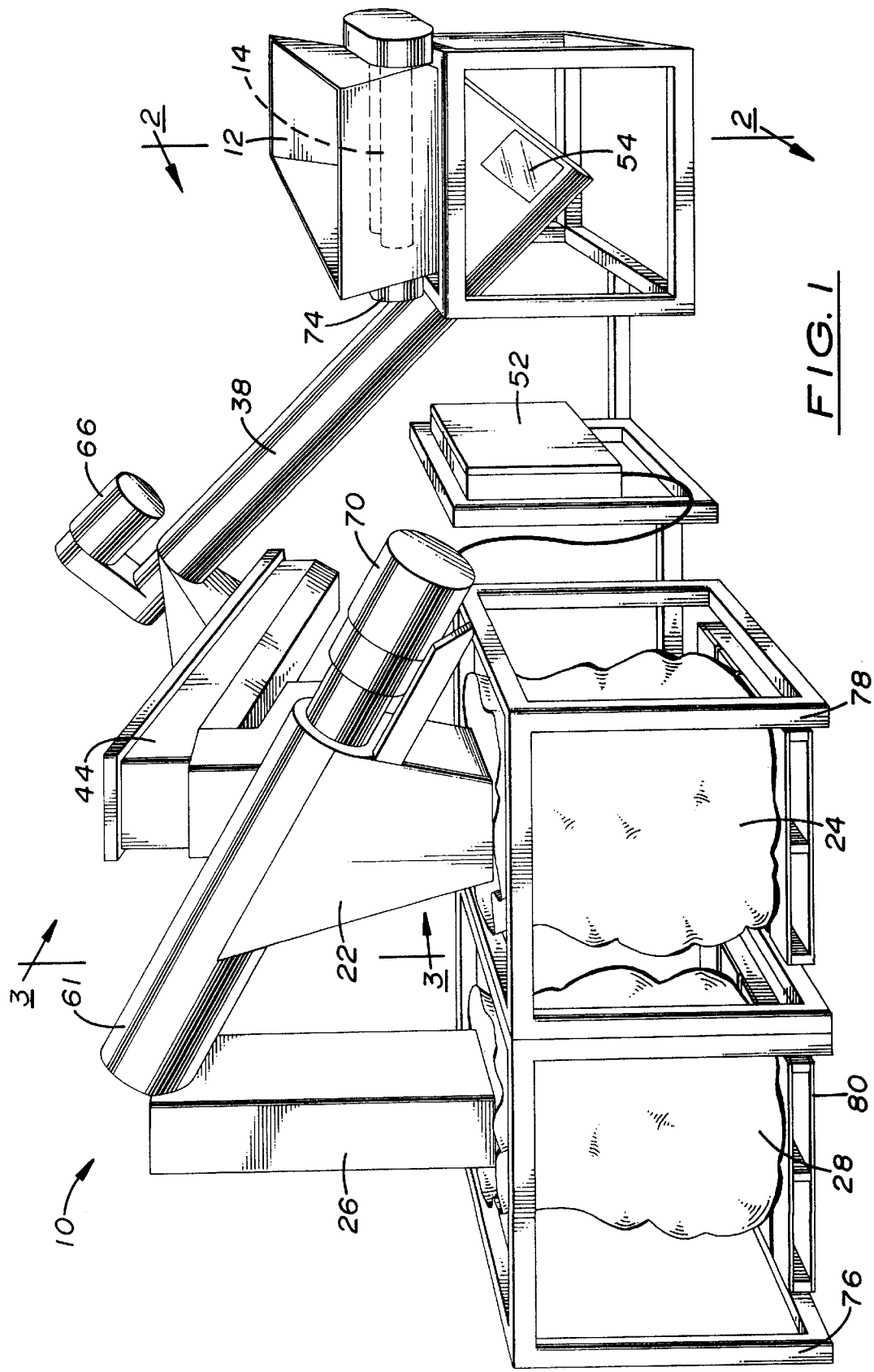
FIG. 1 is a front elevational view of the apparatus of the subject invention.

A preferred embodiment of the apparatus of the subject invention is shown in FIG. 1. A gypsum wallboard recycling machine including a separator to isolate ground gypsum powder from the paper is shown generally at 10. The components of the apparatus of the subject invention are enclosed to reduce the amount of dust released into the environment as the gypsum is ground. The apparatus 10 comprises a crushing means 14 within the main hopper 12, an auger encased by the auger housing 38, a grinding means enclosed by the grinder housing 44 and a separator within the separator housing 61. In operation, wallboard is fed into the main hopper 12 where it is drawn into the apparatus 10 and shredded by the crushing means 14. Crushed material comprising paper shreds and gypsum fragments can be collected or can be transported to the grinding means (at 44) by an auger (at 38). Ground materials of gypsum particles and paper pieces can be collected or can be fed to the separator (at 61) where the gypsum particles or powder exit through the powder chute 22 and are collected in the powder bag 24. The paper pieces are driven through the separator (at 61) and exit through the paper chute 26 to the paper bag 28.

Figure 2:
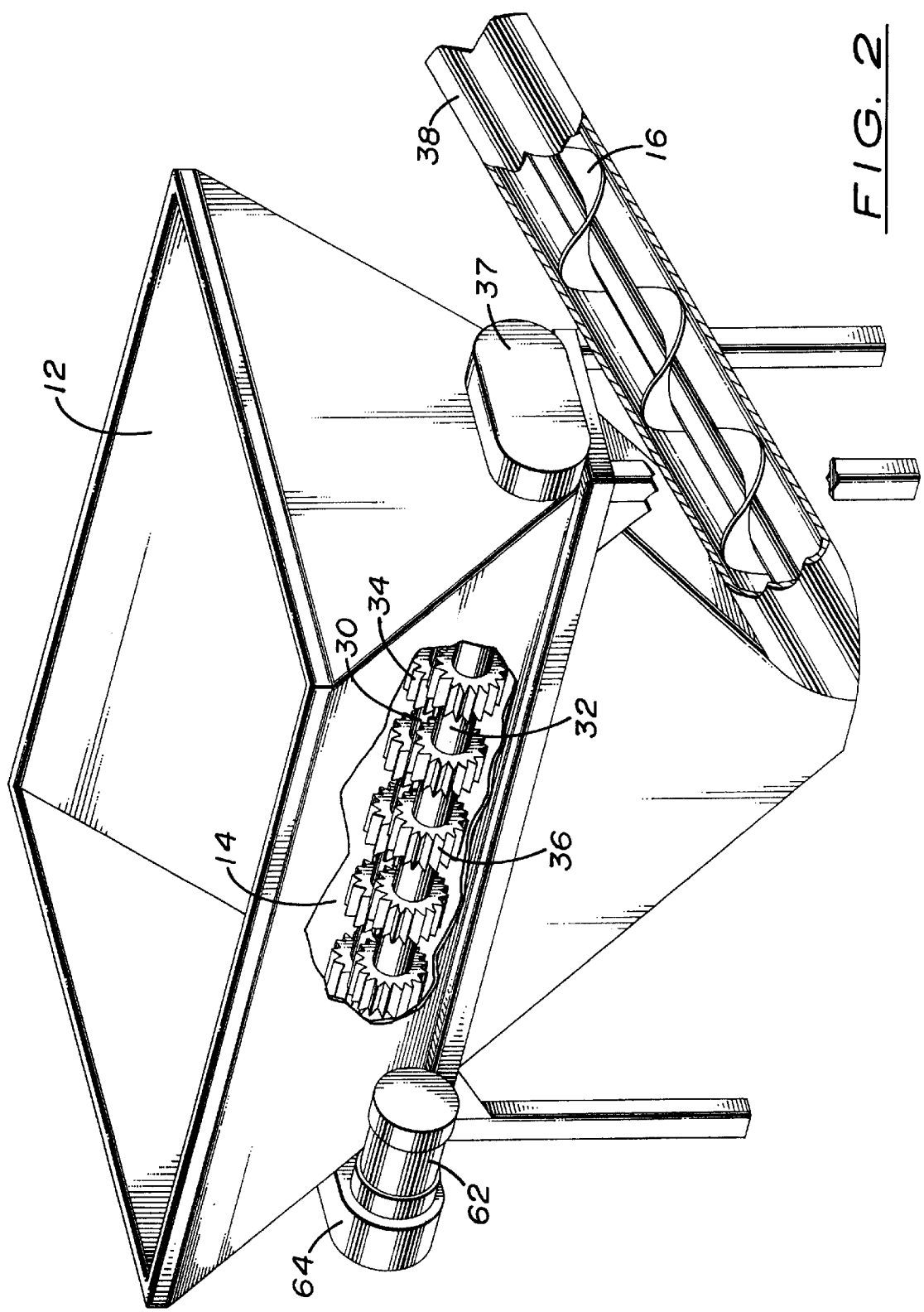
FIG. 2 is a partially exposed view of the crushing means and the transport means of the apparatus of the subject invention.

A preferred embodiment of the crushing means 14 is shown in FIG. 2 in which the crushing means is a dual roller system. Crushing means utilizing a single roller operating against a fixed surface or greater than two rollers can also be used however. In a preferred embodiment, the dual roller system is located within the main hopper 12. Each roller has blades thereupon 34, 36. The blades can have teeth or grabbers to assist in pulling the wallboard into the apparatus. In a preferred embodiment, the blades appear as grooves carved into the surface of the roller. The grooves spiral around the axis of the roller. As shown in FIG. 2, the blades on one roller 30 interdigitate with the blades on the other roller 32 to provide a self-cleaning system. The rollers 30, 32 counter-rotate in a manner which draws the wallboard from the main hopper 12 into the apparatus 10. Roller action is maintained by an oil bath reservoir 37.

It is preferred that rollers be set to rotate at different speeds. For example, roller 30 can be set to rotate at approximately one-half the speed of roller 32. This regulates flow of materials into the apparatus and assures the materials are adequately crushed. When set to rotate at near equivalent speeds materials are pulled by the action of the rollers into the apparatus too quickly and are inadequately crushed. Therefore, the crushing means 14 can also act as a flow regulator for the apparatus ultimately determining the size of the processed gypsum wallboard pieces.

Materials exiting the crusher 14 comprise long strips of paper and fragments of gypsum wallboard core. These materials can be collected from the apparatus or can be transported to the grinding means 18 for further processing where gypsum fragments are ground to finer gypsum particles and paper strips are torn into smaller paper pieces. In one embodiment, crushed materials are transported to the grinding means 18 by an auger 16. The auger 16, in this embodiment, sits within an enclosed auger housing 38 (FIG. 1) to reduce the amount of dust released into the environment by the action of the apparatus 10. In this embodiment, the auger 16 is a simple transport means and does not further grind the materials. Other simple transport means that could be used in the apparatus of the subject invention include, but are not limited to, a friction conveyor or a simple step conveyor. Further, transport means may be constructed that provide a shear force to the materials providing an additional processing step. For example, an auger can be constructed with stators on the interior walls of the auger housing 38. Materials are caught and shredded by the action of the auger against the stators as they are transported to the grinding means 18.

Crushed materials are transported to the grinding means 18. In a preferred embodiment, shown in FIG. 3, the grinding means is a paddle assembly comprising a series of cutting paddles 40 positioned radially about a shaft 42. In a particularly preferred embodiment, the paddle assembly is mounted within a grinder housing 44 on which stators 46 are present. The stators 46 add to the grinding action of the paddles to yield paper pieces which are substantially free from gypsum and approximately the size of a silver dollar.

The angle of the paddles 40 on the shaft 42 affects the speed at which materials flow through the grinding means 18 and therefore the size of the paper pieces exiting the grinding means. In a preferred embodiment, the cutting paddles 40 are adjustable so that the angle of the paddles can be manipulated to vary the composition of the final product. Means by which to attach the cutting paddles 40 to the shaft 42 so that the paddles are adjustable are known to those skilled in the art. For example, locking hinges or pin pivots would allow the paddles to be drawn toward the shaft resulting in less shear between the cutting paddles 40 and stators 46 and therefore larger pieces of paper and more sizable fragments of gypsum. In a particularly preferred embodiment, the paddles 40 are attached to the shaft 42 by threaded stems 94. For illustrative purposes, the threaded stems 94 are shown slightly exposed in FIG. 3. Applying torque to the stems rotates the paddles slightly which sets up a sweeping action moving the material through the grinder. Other means by which the cutting paddles 40 can be mounted to the shaft 42 so they can be adjusted to regulate the flow of materials through the grinder include but are not limited to locking chuck mechanisms. The cutting paddles 40 can be adjusted to produce paper pieces exiting the grinding means 18 that are from about four inches to about one-half inch in length.

Figure 3:
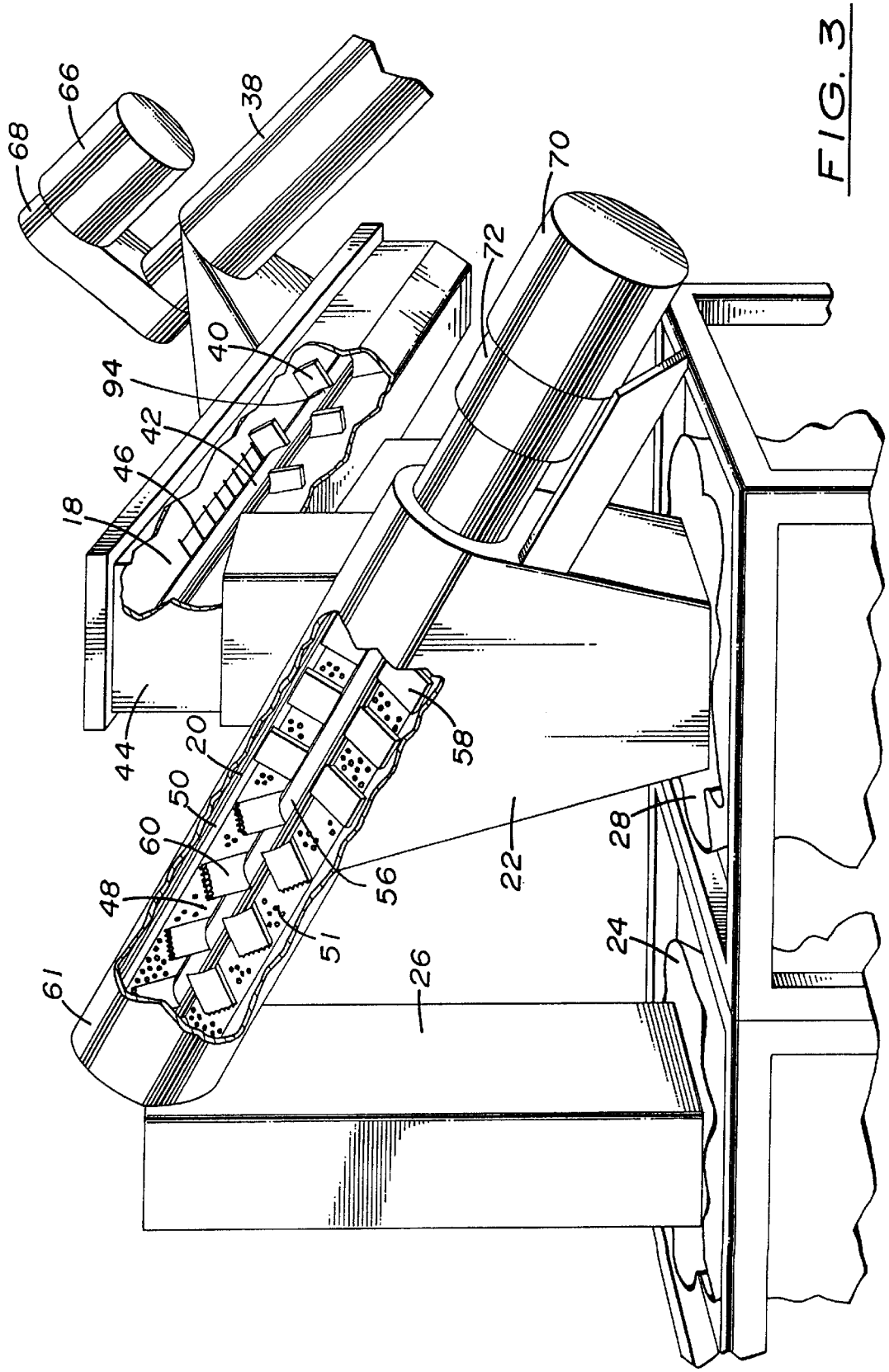
FIG. 3 is a cross sectional view of the grinding means and separator of the apparatus of the subject invention through line 2—2 and 3—3, respectively, of FIG. 1.

Ground material of gypsum particles and paper pieces can be collected from the grinding means 18 or can be fed into a separator 20 (FIG. 3). The separator isolates the ground gypsum from the paper pieces. In a preferred embodiment the separator 20 is a hammer assembly 48 which revolves within a screen drum 50. As the hammer assembly 48 rotates within the screen drum 50, the hammers drive crushed gypsum through the screen of the drum 50 where it falls through the powder chute 22 into the gypsum bag 24. Paper pieces are swept through the drum 50 to the paper chute 26 where they are collected in the paper bag 28.

The screen drum 50 can be partially solid, as shown in FIG. 3, or can be screen material throughout. Perforations 51 in the drum 50 should be of a size sufficient to separate the gypsum particles from the paper pieces. For example, preferably, paper pieces exiting the grinding means 18 are the size of silver dollars or approximately one and one-half inches in diameter. To assure complete separation of the paper pieces from the gypsum particles the perforations 51 in the drum 50 can be from about one inch to about ⅛ inch and preferably ⅜ inches in diameter.

The hammer assembly 48 of the separator 20 comprises a plurality of hammers 58 and 60 mounted radially about a central shaft 56 (FIG. 3). Most importantly, the hammer assembly is mounted within the screen drum 50 so that the distance between the inside of the drum 50 and the end of the hammers 58 distal to the central shaft is such that crushed gypsum is forced through the perforations in the screen and the paper pieces remain in the drum. It is desirable that the distance between the distal end of the hammers and the inside of the drum 50 be sufficient to break apart chunks of gypsum that may remain however not further tear or rip the paper so that small paper pieces are able to fall through the perforations contaminating the gypsum powder. The hammers 58 and 60 can take any shape. Hammers can be flat blocks or curved knobs. In a preferred embodiment, shown in FIG. 3, they are flat paddles. FIG. 3 shows the separator 20 can comprise two types of paddles, separator paddles 58 and paper paddles 60. The paddles vary at their ends distal from the central shaft 56. The separator paddles 58 are blunt at this end insuring the paddles do not further tear the paper pieces as the paper and gypsum particles are forced against the inside of the screen drum 50. The distal end of the paper paddles 60 can be serrated to grab the paper pieces from the inside of the drum 50 and carry them toward the paper chute 26 where they are collected in the paper bag 28. A beveled edge on the paper paddles may also assist in sweeping the paper pieces through the separator 20. In another preferred embodiment paper paddles can have a blunt rubber end where the rubber acts to grab the paper pieces from the drum 50 and move them toward the paper chute 26. Separator paddles 58 are closest to the grinding means 18 and the powder chute 22. Paper paddles 60 are positioned closer to the paper chute 26. In a preferred embodiment, to assist in sweeping the paper along the screen drum 50, the paper paddles 60 are at a slight angle from the axis of the shaft allowing for continual operation of the apparatus where the operator is not required to stop the apparatus to clean out the drum. Further, enclosing the separator 20 within a separator housing 61 reduces the amount of gypsum dust released into the environment providing safer working conditions for the operator.

The apparatus of the subject invention is advantageous in that it allows a single operator to feed and monitor the machine. The main hopper 12 accommodates full size sheets of wallboard and can be filled with many pieces of board and then left so that the operator can monitor the output of the machine. To further facilitate a single operator, a preferred embodiment of the apparatus of the subject invention comprises a unique bag stand 76, 78 to hold the paper bag 28 and powder bag 24. The bag stands 76, 78 are box frame having one open side. The empty bags are attached to the bag stands by hooks around the rim of the stand. The empty bags rest on a palette jack 80 which slides into the bottom of the stand through the open side. After the bag is filled, the bag is unhooked and removed from the bag stand by a forklift using the palette jack. In a preferred embodiment, the bag has a drawstring bottom which opens into a hole in the bottom of the palette jack so the bag can be emptied from the forklift into a container for shipment or disposal by a single operator.

The speed of rotation of the rollers in the crushing means 14 can be coordinated with the speed of the auger 16, grinding means 18 and separator 20 to allow a constant flow of materials through the machine with no interruptions in the operation. The crushing means 14, auger 16, grinding means 18 and separator 20 in the preferred embodiment are simple mechanical systems powered by electric motors driving a gear box, however, systems employing hydraulic and pneumatic principals can also be used. The crusher motor 62 driving the crusher gear box 64 (FIG. 2) and auger motor 66 driving the auger gear box 68 (FIG. 3) should be adjusted so there is no accumulation of materials in the bottom of the main hopper 12 to interfere with the action of the crusher 14. The grinder motor driving the grinder gear box should be adjusted to a rate of speed so that materials received from the auger 16 are adequately processed to provide the desired paper size. The speed of the separator motor 70 driving the separator gear box 72 (FIG. 3) should be monitored to avoid a back-up in the flow of the system and to insure that the force of the paddles against the screen drum 50 is not such that the paper is shredded into smaller pieces within the screen drum 50. Preferably, the crushing means 14, auger 16, grinding means 18 and separator 20 are controlled by separate electrical systems interconnected so that the failure of one function shuts down the others. Further, the motors should run independently but in sequence so that as the system is powered up, in the following order: separator motor 70, grinder motor, auger motor 66 and crusher motor 62. Powering up the system in this order avoids processed materials from accumulating and fowling the machine. Further, each electrical system has a centrally located control which is readily accessible to an operator behind the electrical panel 52 shown in FIG. 1. An operator may shut down the entire system should the operator find that materials are being fed too quickly through the crusher 14 and not being adequately processed or the crusher is providing more material than the auger 16 can transport by pressing a system kill button 74. Monitoring of the crushing means is facilitated by the placement of a viewing panel 54 at the bottom of the main hopper 12 in a preferred embodiment. Viewing panels can be placed in other locations on the apparatus of the subject invention to monitor the recycling process.

The method of the subject invention involves crushing then grinding scraps of wallboard to produce paper pieces that are about one-half inch to about four inches in length and preferably one and one-half inches in diameter and are essentially free of gypsum, and ground gypsum. The paper pieces and gypsum are optionally separated from one another. In a preferred embodiment, crushing of the wallboard scrap into gypsum fragments and paper shreds is accomplished using a dual roller system 14 illustrated by the apparatus of the subject invention. Grinding of the crushed wallboard is accomplished by the action of cutting paddles 40 against stators 46 on the interior of a grinder housing 44. Grinding tears the paper into smaller pieces and pulverizes the gypsum causing the paper to be released from the gypsum. Separating the pulverized gypsum from the paper pieces can be done using a hammer assembly which forces gypsum particles through a screen drum 50 while the paper is retained within the drum and swept into a paper chute 28.

Figure 4:
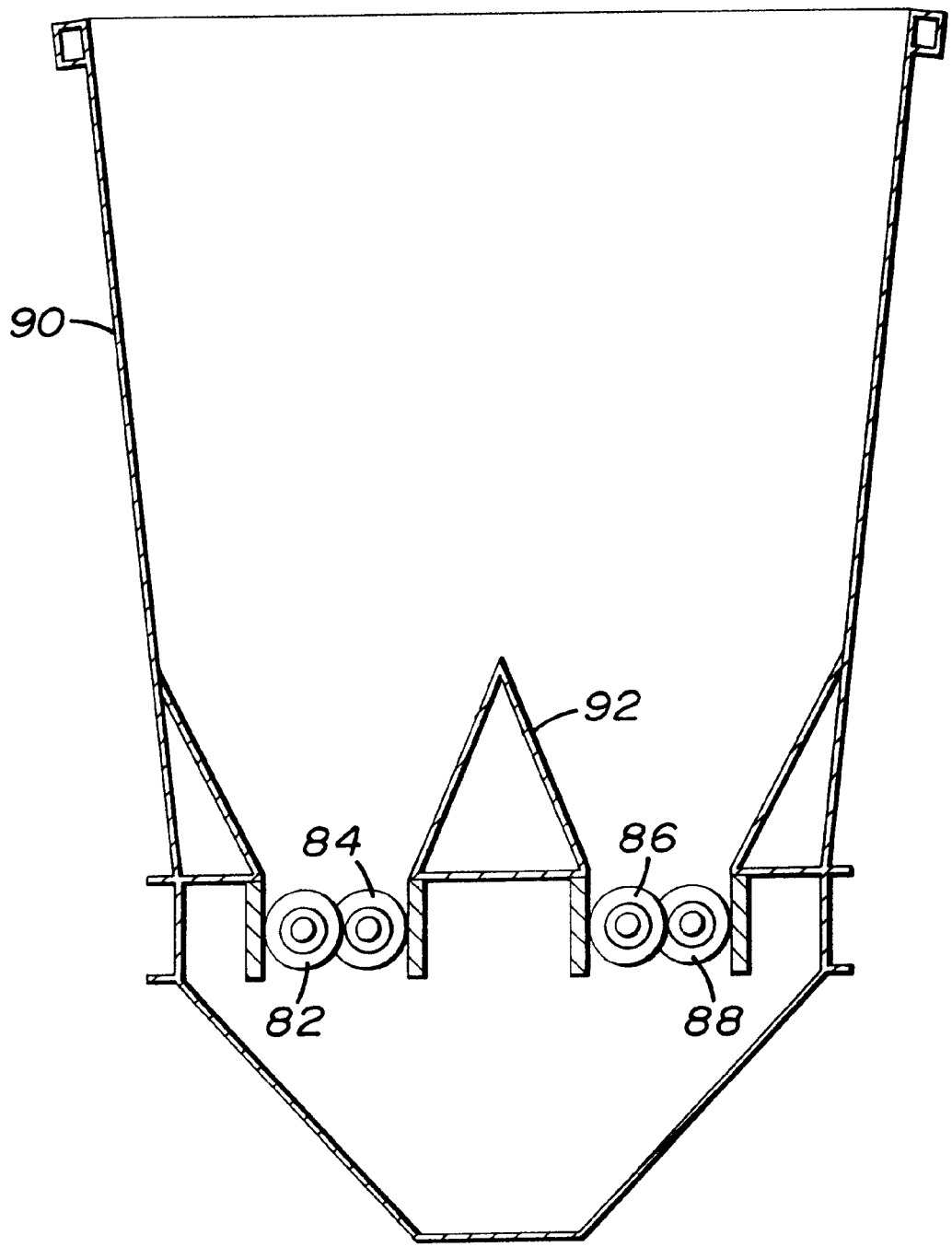
FIG. 4 is a cross-sectional view taken perpendicular to the axis of the rollers of another embodiment of the crushing means of the apparatus of the subject invention.

The apparatus of the exemplified embodiment shown in FIG. 1 processes approximately 3,000 pounds of wallboard per hour and can be run continuously by a single operator. Wallboard manufacturing plants however turn out tens of thousands of pounds of waste wallboard per hour. The apparatus of the subject invention can be modified to accommodate this greater quantity of wallboard. Modifications to scale-up production from the subject wallboard recycling apparatus would be apparent to those skilled in the art. For example, such modifications include the addition of a second set of rollers withing the crusher hopper. FIG. 4 shows an oversized crusher hopper 90 comprising a first set 82, 84 of two rollers and a second set 86, 88 of two rollers. A concave spacer 92 separates the sets of rollers and assists in directing the wallboard toward the rollers. This single modification to the apparatus of the subject invention allows approximately 10,000–30,000 pounds of waste wallboard to be processed per hour. Further, it is important to note that the modified apparatus can still be run continuously and by a single operator. Other modifications, for example, to the transport means to handle the added volume, or the addition or enlargement of other components of the apparatus are anticipated for the scale-up process.

It is understood that the foregoing is illustrative of the present invention and variations thereof which operate in the same fashion to achieve the same result may obviously be made without departing from the spirit of this invention. Certain modifications of the apparatus and/or methods employed may be made and still achieve the objectives of the invention. Such modifications are contemplated as within the scope of the claimed invention.

What is claimed is:

1. An apparatus for recycling wallboard of a gypsum core sandwiched between paper covers, the apparatus comprising a crushing means to crush the gypsum core into gypsum fragments and shred the paper covers, a grinding means to pulverize the gypsum fragments into gypsum particles and further tear the shredded paper into paper pieces and a separator to isolate the gypsum particles from the paper pieces, the separator comprises a hammer assembly rotating within a screen drum wherein the hammer assembly forces the gypsum particles through the screen drum while the paper pieces are retained within the drum, the hammer assembly comprising a plurality of paddles mounted radially on a central shaft and having a proximal end attached to the central shaft and a distal end away from the central shaft, the paddles are separator paddles having the distal ends which are blunt and paper paddles having the distal ends which are selected from the group consisting of blunt rubber, serrated and beveled whereby the paper covers are released from the gypsum core and the gypsum particles are isolated from the paper pieces.

2. The apparatus according to claim 1, wherein said crushing means comprises at least one roller.

3. The apparatus according to claim 2, wherein said roller has blades.

4. The apparatus according to claim 1, wherein the crushing means comprises a first roller and a second roller which counter-rotate to draw said wallboard into said apparatus, said first roller and said second roller having interdigitating blades which are self-cleaning.

5. The apparatus according to claim 4, wherein said first roller and said second roller rotate at different speeds to regulate the flow of said wallboard into said apparatus and to maximize crushing of said wallboard.

6. The apparatus according to claim 1, wherein the crushing means comprises a first set of rollers which counter-rotate to draw said wallboard into said apparatus, and a second set of rollers which counter-rotate to draw said wallboard into said apparatus, said rollers having interdigitating blades which are self-cleaning and, said first set of rollers and said second set of rollers separated by a spacer.

7. The apparatus according to claim 1, further comprising a transport means to move said gypsum fragments and said shredded paper from said crushing means to said grinding means.

8. The apparatus according to claim 7, wherein said transport means is an auger.

9. The apparatus according to claim 1, wherein said grinding means is a paddle assembly comprising a plurality of cutting paddles mounted radially about a central shaft within a housing.

10. The apparatus according to claim 9, wherein said housing comprises stators.

11. The apparatus according to claim 9, wherein said cutting paddles are adjustable on said central shaft so as to regulate the flow of said gypsum fragments and shredded paper through said grinding means and the size of said resulting gypsum particle and paper pieces.

12. The apparatus according to claim 11, wherein said cutting paddles are mounted to said central shaft by threaded stems which screw into said central shaft allowing said cutting paddles to be adjusted on said central shaft.

* * * * *